United States Patent [19]
Sakurai et al.

[11] Patent Number: 5,208,863
[45] Date of Patent: May 4, 1993

[54] ENCODING METHOD FOR SYLLABLES

[75] Inventors: Atsushi Sakurai, Yokohama; Junichi Tamura, Tokyo; Tetsuo Kosaka, Yokohama, all of Japan

[73] Assignee: Canon Kabushiki Kaisha, Tokyo, Japan

[21] Appl. No.: 608,376

[22] Filed: Nov. 2, 1990

[30] Foreign Application Priority Data

Nov. 7, 1989 [JP] Japan .................... 1-290912

[51] Int. Cl.⁵ .............................................. G10L 5/00
[52] U.S. Cl. ....................................... 381/43; 381/51
[58] Field of Search ............................ 381/51, 43, 41

[56] References Cited

U.S. PATENT DOCUMENTS

| | | | |
|---|---|---|---|
| 4,389,059 | 8/1983 | Lin et al. | 381/51 |
| 4,700,322 | 10/1987 | Benbassat et al. | 381/51 |
| 4,829,573 | 5/1989 | Gagnon et al. | 381/41 |
| 4,862,504 | 8/1989 | Nomura | 381/51 |

OTHER PUBLICATIONS

"An approach to speech recognition using syllabic decision units", Ruske and Schotola, CH1285-6/78/00-00-0722100.75 @ 1978 IEEE pp. 722-725.
Application S.N. 470,774 filed Jan. 26, 1990, Tamura.
Application S.N. 904,906 filed Jan. 25, 1992, Tamura.
Application S.N. 490,462 filed Mar. 8, 1990, Aso.
Application S.N. 492,071 filed Mar. 12, 1990, Aso.
Application S. N. 592,304 filed Oct. 2, 1990, Kosaka.
Application S.N. 599,582 filed Oct. 19, 1990, Tamura.

*Primary Examiner*—Emanuel S. Kemeny
*Attorney, Agent, or Firm*—Fitzpatrick, Cella, Harper & Scinto

[57] ABSTRACT

A method for encoding syllables of a language, particularly the Japanese language, and for facilitating the extraction of sound codes from the input syllables, for voice recognition or voice synthesis includes the step of providing a syllable classifying table, in which each syllable is represented by an upper byte code indicating the consonant part of the syllable and a lower byte code indicating the non-consonant part of the syllable. The consonants constitute a first category of data classified by phonetic features, while the non-consonants constitute a second category of data classified by phonetic features, so that the extraction of consonant or non-consonant sounds can be made by a search in only the first or the second categories. The encoding of diphthongs are made in such a manner that those containing the same vowel have the same remainder corresponding to the code of this vowel, when the codes are divided by the number of vowels contained in the second category, so that the extraction of a vowel from diphthongs can be achieved by a simple mathematical division.

7 Claims, 11 Drawing Sheets

| | VOWEL SEMI-VOWEL | 00 | 01 | 02 | 03 | 04 | 05 | 06 | 07 | 08 | 09 | 0A | 0B | 0C | 0D | 0E |
|---|---|---|---|---|---|---|---|---|---|---|---|---|---|---|---|---|
| | CONSONANT | A | I | U | E | O | JA | | JU | JE | JO | WA | WI | | WE | WO |
| 00 | | A | I | U | E | O | JA | | JU | JE | JO | WA | WI | | WE | WO |
| 01 | K | KA | KI | KU | KE | KO | KJA | | KJU | KJE | KJO | KWA | KWI | | KWE | KWO |
| 02 | S | SA | SI | SU | SE | SO | | | | | | | | | | |
| 03 | s | | sI | | | | sJA | | sJU | sJE | sJO | | | | | |
| 04 | T | TA | TI | TU | TE | TO | | | | | | | | | | |
| 05 | c | | cI | | | | cJA | | cJU | cJE | cJO | | | | | |
| 06 | C | CA | CI | CU | CE | CO | | | | | | | | | | |

LESS SIGNIFICANT BYTE — MOST SIGNIFICANT BYTE

FIG. 1

| FIG. 1A |
|---------|
| FIG. 1B |

FIG. 1A

| CON-SONANT | VOWEL SEMI-VOWEL | 00 | 01 | 02 | 03 | 04 | 05 | 06 | 07 | 08 | 09 | 0A | 0B | 0C | 0D | 0E |
|---|---|---|---|---|---|---|---|---|---|---|---|---|---|---|---|---|
| 00 | | A | I | U | E | O | JA | | JU | JE | JO | WA | WI | | WE | WO |
| 01 | K | KA | キ KI / シ SI | KU | KE | KO | ヤ JA | | ユ JU | イェ JE / キェ KJE | ヨ JO / キョ KJO | ワ WA / クヮ KWA | ヰ WI / クヰ KWI | | ヱ WE / クヱ KWE | ヲ WO / クヲ KWO |
| 02 | S | SA | シ SI | SU | SE | SO | キャ KJA | | キュ KJU | | | | | | | |
| 03 | s | | シ sI | | | | シャ sJA | | シュ sJU | シェ sJE | ショ sJO | | | | | |
| 04 | T | TA | チ TI | ツ TU | TE | TO | | | | | | | | | | |
| 05 | c | | チ cI | ツ cU | | | チャ cJA | | チュ cJU | チェ cJE | チョ cJO | | | | | |
| 06 | C | ツァ CA | ツィ CI | | ツェ CE | ツォ CO | | | | | | | | | | |

TO FIG. 1B

LESS SIGNIFICANT BYTE (columns) / MOST SIGNIFICANT BYTE (rows)

FIG. 1B
FROM FIG. 1A

| | | NA | NI | NU | NE | NO | NJA | NJU | NJE | NJO | | | | |
|---|---|---|---|---|---|---|---|---|---|---|---|---|---|---|
| 07 | N | NA | NI | NU | NE | NO | NJA | NJU | NJE | NJO | | | | |
| 08 | H | HA | HI | HU | HE | HO | HJA | HJU | HJE | HJO | | | | |
| 09 | F | FA | FI | | FE | FO | FJA | FJU | FJE | FJO | | | | |
| 0A | M | MA | MI | MU | ME | MO | MJA | MJU | MJE | MJO | | | | |
| 0B | R | RA | RI | RU | RE | RO | RJA | RJU | RJE | RJO | | | | |
| 0C | P | PA | PI | PU | PE | PO | PJA | PJU | PJE | PJO | | | | |
| 0D | G | GA | GI | GU | GE | GO | GJA | GJU | GJE | GJO | GWA | GWI | GWE | GWO |
| 0E | g | gA | gI | gU | gE | gO | gJA | gJU | gJE | gJO | gWA | gWI | gWE | gWO |
| 0F | Z | ZA | ZI | ZU | ZE | | | | | | | | | |
| 10 | z | | zI | | | | zJA | zJU | zJE | zJO | | | | |
| 11 | D | DA | DI | DU | DE | DO | DJA | DJU | DJE | DJO | | | | |
| 12 | B | BA | BI | BU | BE | BO | BJA | BJU | BJE | BJO | | | | |
| 13 | V | VA | VI | VU | VE | VO | VJA | VJU | VJE | VJO | | | | |

FIG. 4
PRIOR ART

LESS SIGNIFICANT BYTE

| VOWEL CONTRACTED / CONSONANT SEMIVOWEL | | 00 | 01 | 02 | 03 | 04 | 05 | 06 | 07 |
|---|---|---|---|---|---|---|---|---|---|
| | | A | I | U | E | O | YA | YU | YO |
| 00 | | A | I | U | E | O | | | |
| 01 | K | KA | KI | KU | KE | KO | KYA | KYU | KYO |
| 02 | S | SA | SI シ | SU | SE | SO | SYA シャ | SYU シュ | SYO ショ |
| 03 | T | TA | TI チ | TU ツ | TE | TO | TYA チャ | TYU チュ | TYO チョ |
| 04 | N | NA | NI | NU | NE | NO | NYA | NYU | NYO |
| 05 | H | HA | HI | HU | HE | HO | HYA | HYU | HYO |
| 06 | M | MA | MI | MU | ME | MO | MYA | MYU | MYO |
| 07 | Y | YA | | YU | | YO | | | |
| 08 | R | RA | RI | RU | RE | RO | RYA | RYU | RYO |
| 09 | W | WA | | | | WO | | | |
| 0A | G | GA | GI | GU | GE | GO | GYA | GYU | GYO |
| 0B | Z | ZA | ZI ジ | ZU | ZE | ZO | ZYA ジャ | ZYU ジュ | ZYO ジョ |
| 0C | D | DA | DI ジ | DU ズ | DE | DO | DYA ジャ | DYU ジュ | DYO ジョ |
| 0D | B | BA | BI | BU | BE | BO | BYA | BYU | BYO |
| 0E | P | PA | PI | PU | PE | PO | PYA | PYU | PYO |

MOST SIGNIFICANT BYTE

FIG. 5
PRIOR ART

LESS SIGNIFICANT BYTE

MOST SIGNIFICANT BYTE

| VOWEL CONTRACTED / CON-SONANT SEMIVOWEL | | 00 | 01 | 02 | 03 | 04 | 05 | 06 | 07 |
|---|---|---|---|---|---|---|---|---|---|
|  |  | A | I | U | E | O | YA | YU | YO |
| 10 | SY |  |  |  | シェ SYE |  |  |  |  |
| 11 | TX |  | ティ TAI |  |  |  |  |  |  |
| 12 | TY |  |  |  | チェ TYE |  |  |  |  |
| 13 | ZY |  |  |  | ジェ ZYE |  |  |  |  |
| 14 | DX |  | ティ DXI |  |  |  |  |  |  |
| 15 | KW | クァ KWA | クィ KWI |  | クェ KWE | クォ KWO |  |  |  |
| 16 | GW | グァ GWA | グィ GWI |  | グェ GWE | グォ GWO |  |  |  |

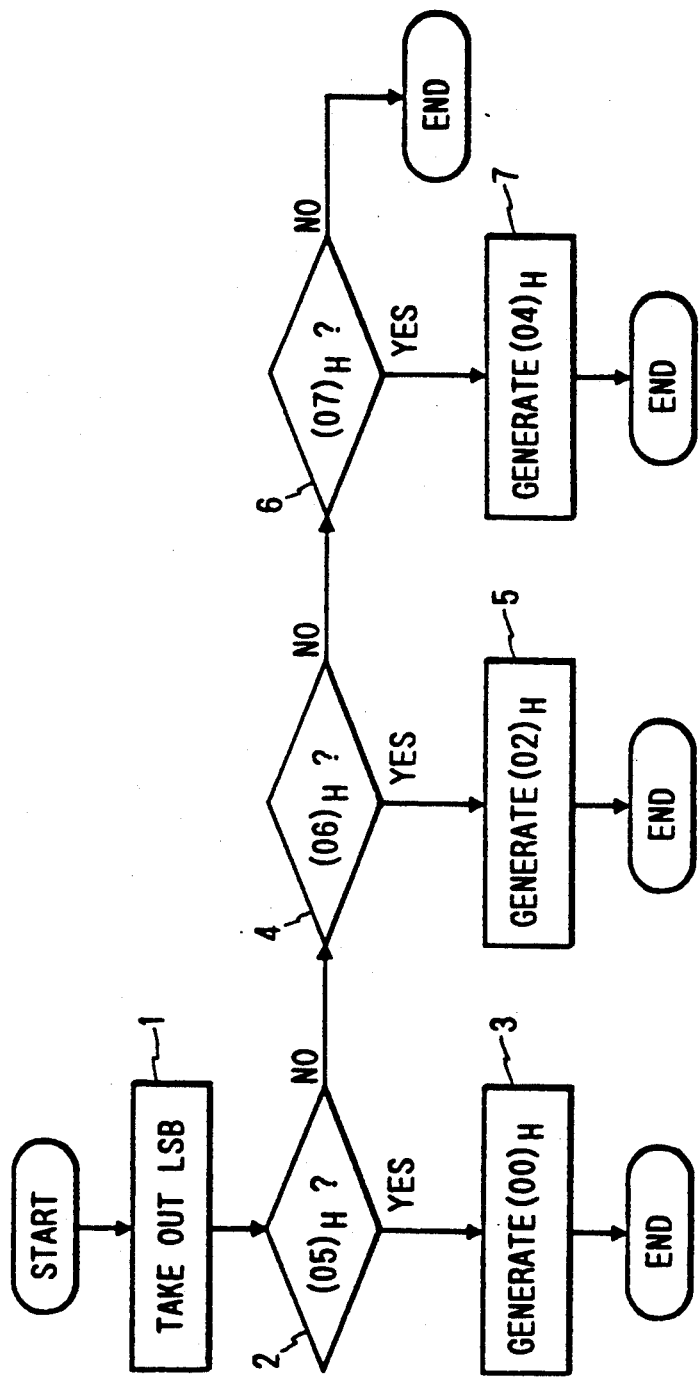

ENCODING METHOD FOR SYLLABLES

BACKGROUND OF THE INVENTION

1. Field of the Invention

The present invention relates to a method for encoding syllables, indispensable for voice recognition or voice synthesis.

2. Related Background Art

Conventional encoding of syllables in the Japanese language does not usually consider the phonetic properties of such syllables, but depends on a Japanese syllable table as shown in FIG. 4, which includes contracted sounds, based on an alphabetical representation of the Japanese language.

However, such a conventional method requires a complex process for extracting a sound code for a consonant in a syllable comprising a semivowel-vowel combination, because such a semivowel-vowel combination includes consonants belonging to the category of most significant or upper bytes.

Also in the conventional method, a consonant, which may become phonetically different depending on the vowel associated therewith, is always treated the same. As a result, identification of this sound requires a survey of not only the most significant or upper bytes but also the less significant or lower bytes.

In addition, in a convention syllable table as shown in FIGS. 4 and 5, the codes are simply sequentially assigned to the sounds of semivowel-vowel combinations, not in accordance with any rule linking the codes and vowels, in the category of lower bytes. Consequently, the extraction of a vowel only from a syllable requires a complex process because all the syllables have to be surveyed one at a time.

SUMMARY OF THE INVENTION

According to the present invention, for simplifying the process of extracting the consonant part of a syllable, consonants only are collected in the category of upper bytes, and other sounds are collected in the category of lower bytes.

In the present invention, the syllables of the Japanese language are represented by the combination of elements in a first category and elements in a second category. The first category includes only the consonant parts of the syllables of the Japanese language. These consonant parts are classified into mutually different phonetic sounds. The second category includes the non-consonants parts of the syllables of the Japanese language. These non-consonant parts are classified into mutually different phonetic sounds. All the syllables of the Japanese language, including even foreign language-derived sounds and onomatopoeic sounds, can be synthesized or recognized using a simple and clear process.

In the present invention, in order to simplify the process for extracting the vowel only from the lower bytes, the non-consonant sounds of the second category are so encoded that vowel and semivowel-vowel combinations including the same vowel provide the same remainder when the sound codes are divided by $(05)_H$.

BRIEF DESCRIPTION OF THE DRAWINGS

FIGS. 1A and 1B are Japanese syllable tables embodying the present invention;

FIG. 4 is a conventional Japanese syllable table;

FIG. 5 is a conventional table for foreign language-derived sounds and onomatopoeic sounds;

FIG. 6-1 and 6-2 are flow charts of a conventional sequence for extracting a consonant code from a Japanese syllable;

FIGS. 7-1 and 7-2 are flow charts of a conventional consonant extracting process including foreign language-derived sounds and onomatopoeic sounds.

DETAILED DESCRIPTION OF THE PREFERRED EMBODIMENTS

Figure 3:
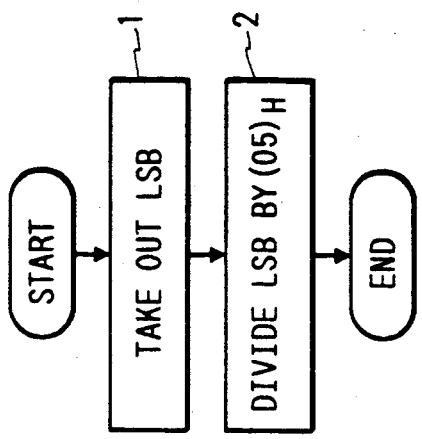
FIG. 3 is a flow chart of a sequence of steps for extracting a vowel code from a Japanese syllable.
Figure 2:
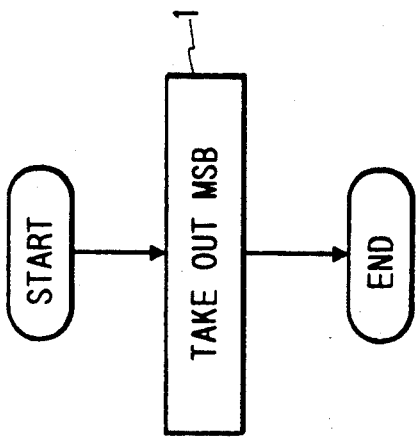
FIG. 2 is a flow chart of a sequence of steps for extracting a vowel code from a Japanese syllable.
Figures 1, 6:
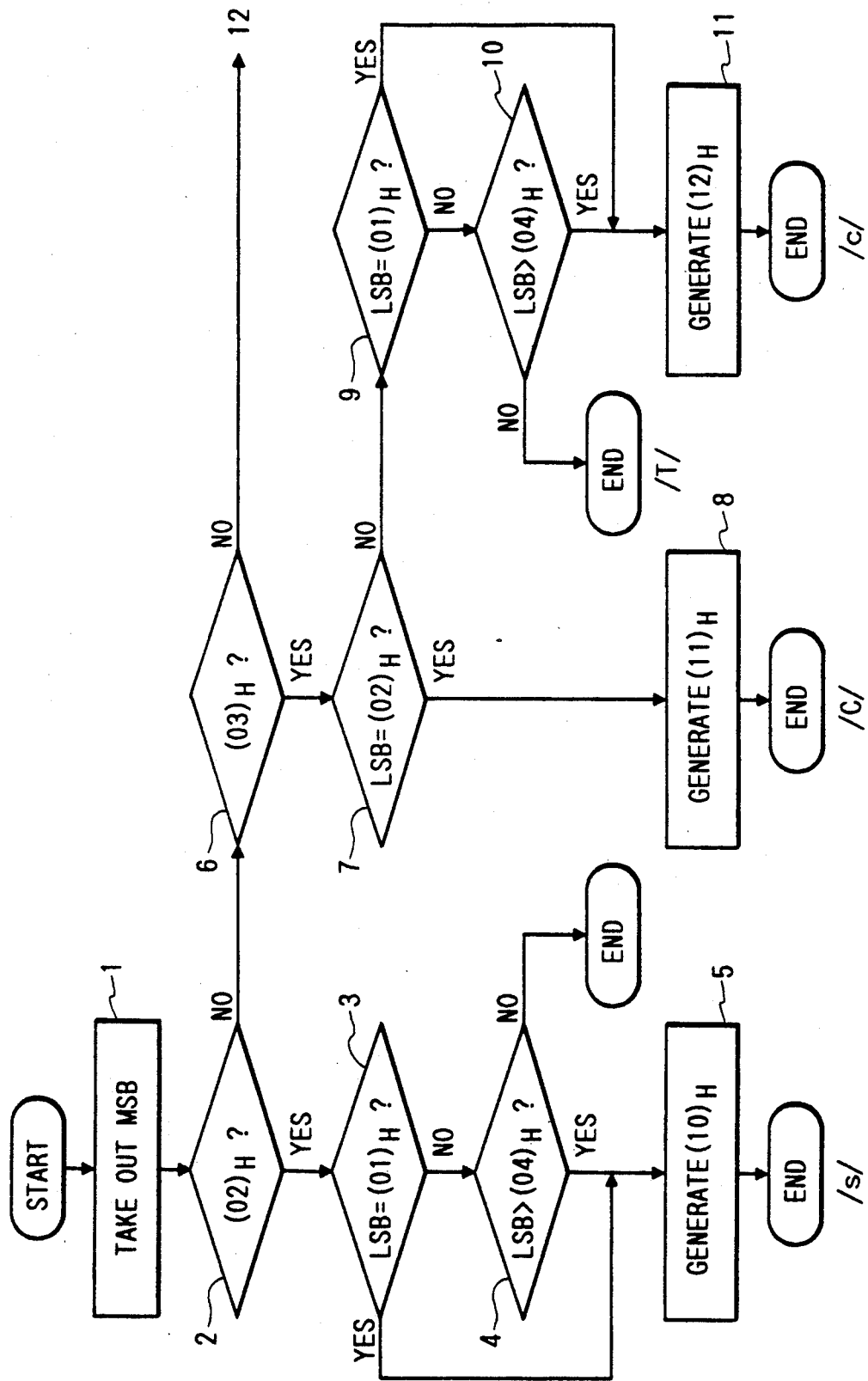
Figures 2, 6:
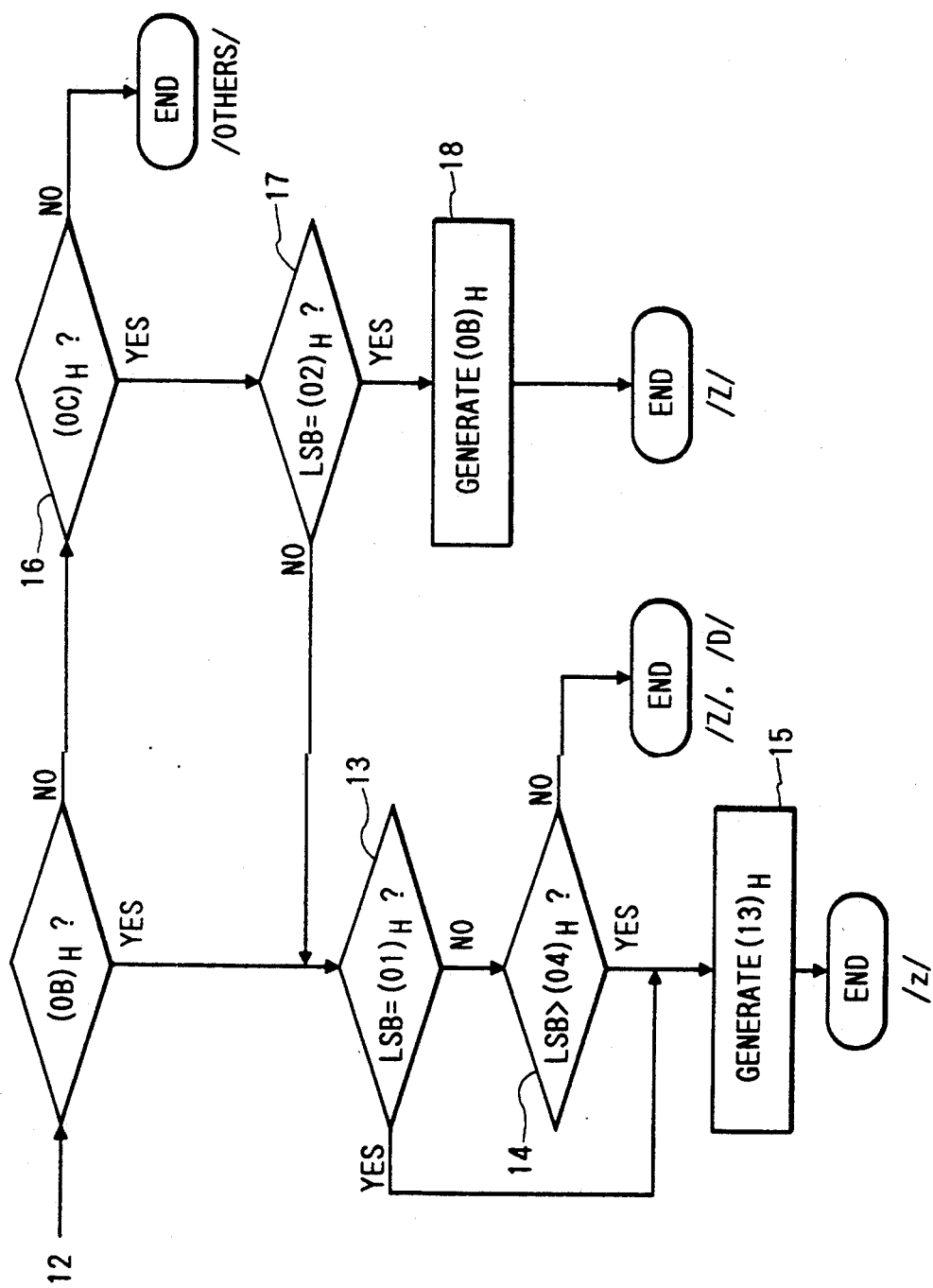

FIGS. 1, 2 and 3 illustrate a first embodiment of the present invention. FIG. 1 shows a table of syllables of the Japanese language, best demonstrating the features of the present invention. A syllable of the Japanese language is composed of upper bytes (most significant bytes) representing a consonant part, and lower bytes (less significant bytes) representing non-consonant phonemes. Non-consonant phonemes include vowels, semivowels and combinations thereof.

In the conventional table shown in FIG. 4, an upper byte $(02)_H$ represents different sounds formed by combining the consonant character "s", which starts the sound, with different contracted vowels. These sounds are displayed in the row having "02" therein in FIG. 4. However, there is more than one consonant in the syllables in this row. Specifically, the consonant can be an alveolar fricative sound /s/ or an alveolar-palatal fricative sound /ʃ/. More specifically, the consonant part "S" in the syllables "SA", "SU", "SE" and "SO" is the sound /s/, while the consonant part "S" in the syllables "SI", "SYA", "SYU", "SYO" is the sound /ʃ/. The same situation occurs for the consonant characters "T", "Z" and "D" which are respectively represented by hexadecimal upper bytes $(03)_H$, $(OB)_H$ and $(OC)_H$. In FIGS. 4 and 5, the consonant sound of the syllables, associated with Kana characters, is different from that of other consonant sounds of syllables having the same consonant characters but different non-consonant sounds associated therewith.

Consequently, in the conventional table, not only the upper bytes, but also the lower bytes have to be surveyed in order to identify the sound of the consonant part of a syllable. In contrast, in the present invention, the upper bytes encode the different sounds of the consonant part of Japanese syllables. The encoding is made according to the phonetic features of the sound in such a manner that each of the consonant sounds is in principle represented by an alphabetical capital letter, but a small letter is also used for a phonetically similar sound.

In the lower bytes, the non-consonant phonemes of Japanese syllables are encoded. Five vowels are represented by alphabetic capital letters /A/, /I/, /U/, /E/ and /O/, while semivowels are represented by two alphabetical capital letters /JA/, /JU/, /JE/, /JO/, /WA/, /WI/, /WE/, and /WO/. Codes $(06)_H$ and $(OC)_H$, corresponding to semivowels /JI/ and /WE/ which are not pronounced in Japanese, are left blank.

The present invention allows easy systematization of syllables because foreign language derived syllables and onomatopoeic syllables can be easily added.

Examples of such foreign language-derived sounds include the sound /ジェ/ (/sJE/) in the word "chef", /テイ/ (/TI/), in the word "timpani", /チェ/ (/cJE/) in the word "chess", and /KWO/ in the word "quartz". Also, an example of such onomatopoeic syllables is /クォ/ (/GWO/) in the word "GWOON".

FIG. 2 shows a flow chart of a sequence required in voice recognition or voice synthesis, for extracting the sound code of the consonant part only from a Japanese encoded syllable. According to the present invention, the upper byte of two bytes constituting a syllables in the Japanese language represents the sound of the consonant part of the syllable. The objective of this sequence can be achieved simply by "taking out the upper byte" in step 1. On the other hand, the conventional method of extracting the sound code of the consonant part from a Japanese encoded syllable requires a complex process of 18 steps in total, as shown in FIGS. 6.1 and 6.2, because the lower bytes have to be surveyed in succession depending on the upper byte, inasmuch as the sound of the upper byte varies according to which lower byte the upper byte is combined with.

Figures 1, 7:
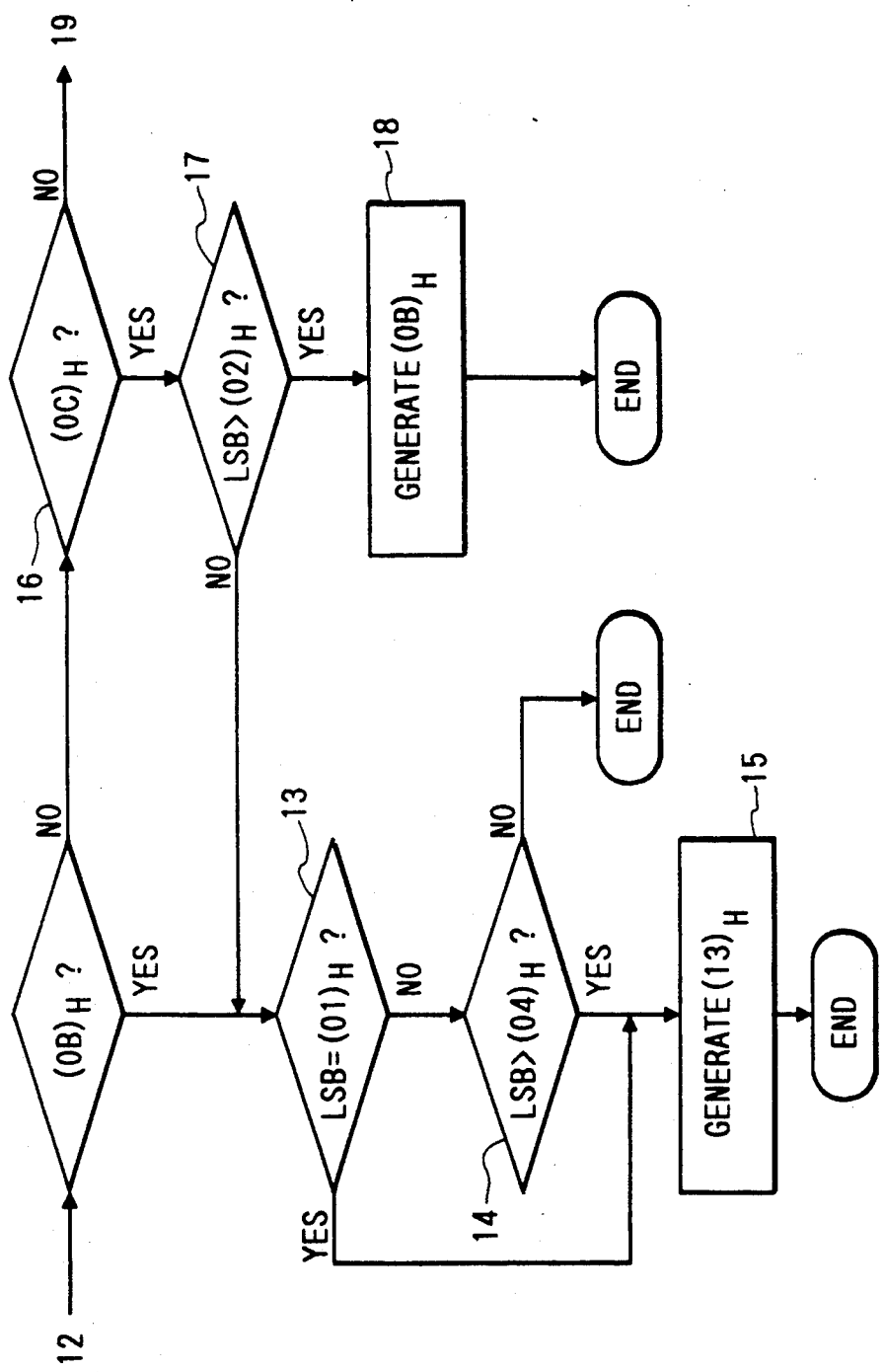
Figures 2, 7:
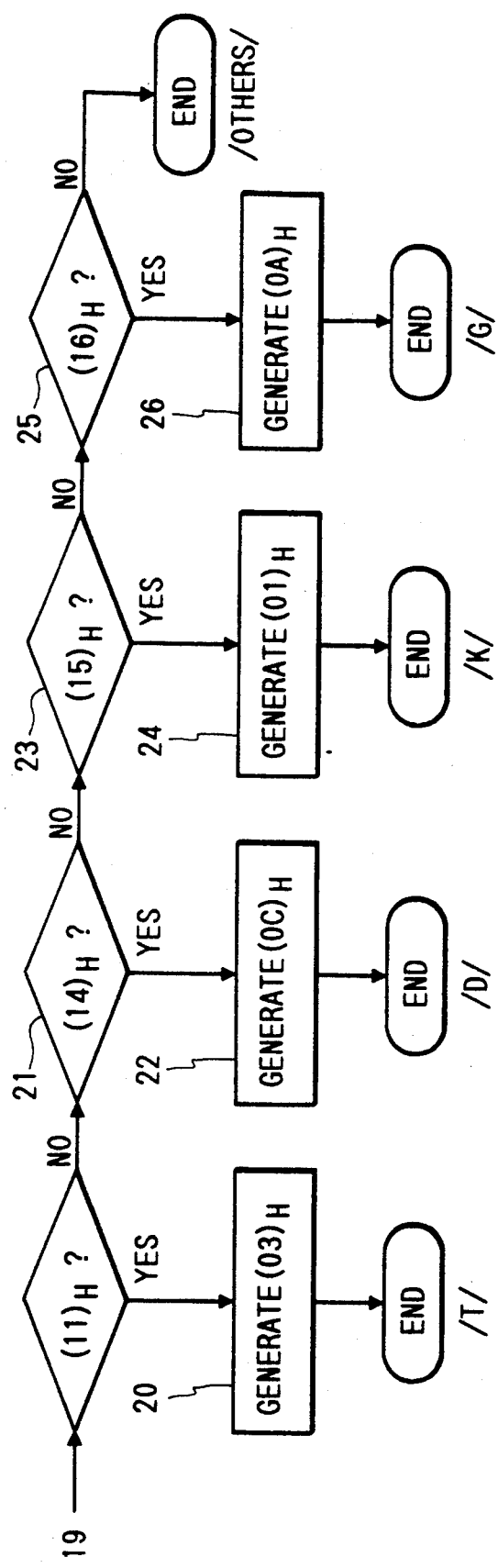

Also in the conventional method, if the foreign language-derived sounds /シェ/ (/SYE/), /タイ/ (/TAI/), /チェ/ (/TYE/), /ジェ/ (/ZYE/), /ヂ/ (/DXI/), /クヮ/ (/KWA/), /クィ/ (/KWI/), /クェ/ (/KWE/) and /クォ/ (/KWO/), and the onomatopoeic sounds /グヮ/ (/GWA/), /グィ/ (/GWI/), /グェ/ (/GWE/) and /グォ/ (/GWO/) shown in FIG. 5 are added to the sounds in FIG. 4, there will be required a complex process of 26 steps as shown in FIGS. 7-1 and 702. On the other hand, according to the present invention, the process does not change because the foreign language-derived sounds and onomatopoeic sounds are incorporated in the same table as shown in FIG. 1 and these sounds are also represented by the upper byte.

Figure 8:
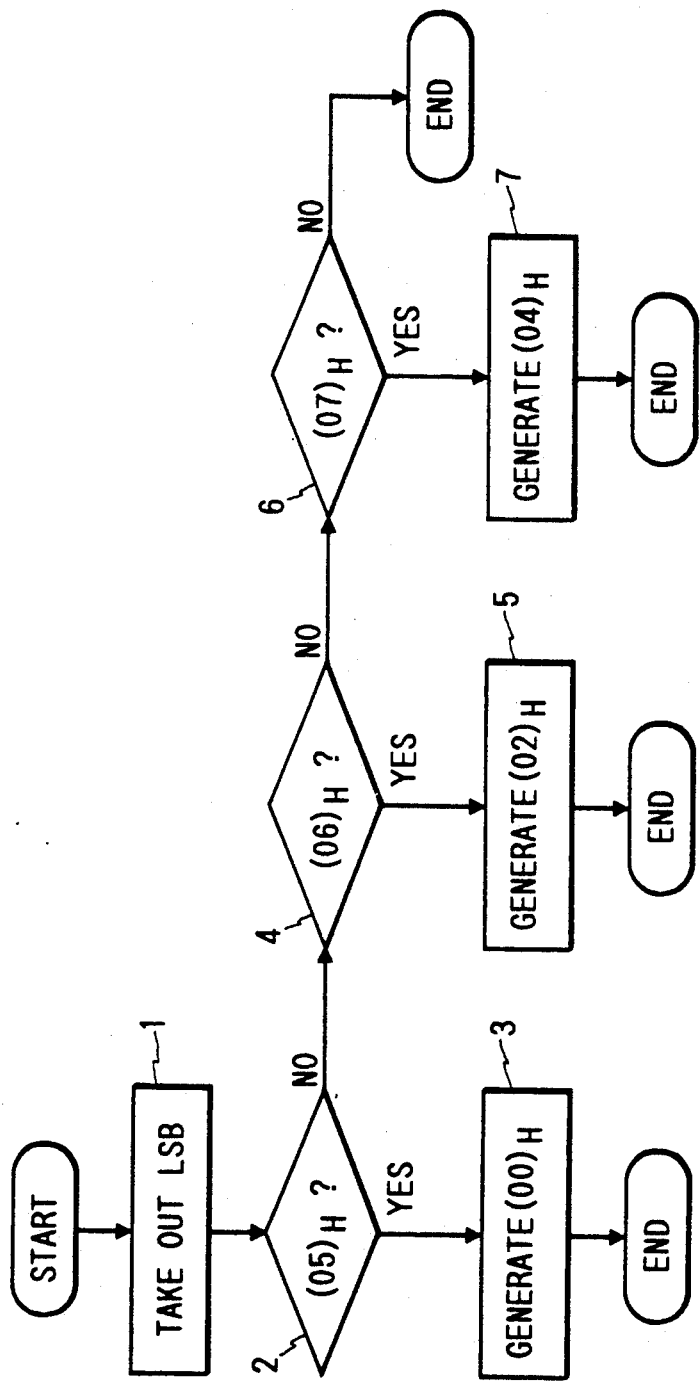
FIG. 8 is a flow chart of a conventional sequence for extracting a vowel code from a Japanese syllable.

FIG. 3 is a flow chart of the sequence required in voice recognition or voice synthesis, for extracting the sound codes of five vowels from the encoded Japanese syllables. In the table of the present invention, the semivowels are encoded in such a manner that the extraction of a corresponding vowel from a semivowel, such as extracting vowel /A/ from the semivowel /JA/ or /WA/, or extracting vowel /I/ from semivowel /WI/, can be achieved by extracting the lower byte from the encoded Japanese syllable (step(1)), and dividing the lower byte by $(05)_H$ and determining the remainder which corresponds to the code of the vowel (step (2)). Consequently the extraction of the sound codes of five vowels only from the encoded Japanese syllables can be achieved in the above-mentioned two steps. On the other hand, the same process using the conventional table shown in FIG. 4 requires a sequence of 7 steps in total, as shown in FIG. 8.

[Extraction of sound code for a consonant from the word "テイ" ("BETTY")]

(1) Conventional method

"ベ" ("BE") is represented by /BE/ with a code $(0D03)_H$, while "テイ" ("TTY") is represented by /TXI/ with a code $(1101)_H$. Upper bytes are taken out from these codes and are processed according to the flow charts shown in FIGS. 6 and 7 to obtain consonant sound codes as shown in the following:

(i) Process for $(0D03)_H$:

The sound code for the consonant of "ベ" ("BE") is deterred as $(OD)_H$, by the nine steps of (1), (2), (6), (12), (16), (19), (21), (23) and (25).

(ii) Process for $(1101)_H$

The sound code for the consonant of "テイ" ("TTY") is determined as $(03)_H$, by the seven steps of (1), (2), (6), (12), (16), (19) and (20).

(2) Method of the present invention

"ベ" ("BE") is represented as /BE/ with a code $(1103)_H$, while "テイ" ("TTY") is represented as /TI/ with a code $(0401)_H$. The sound codes for the consonants are obtained according to the blow chart shown in FIG. 2.

(i) Process for $(1103)_H$

The sound code $(11)_H$ for the consonant of ベ

"("BE") can be obtained by step (1) only.

(ii) Process for $(0401)_H$

The sound code $(04)_a$ for the consonant of "テイ" ("TTY") can be obtained by step (1) only.

The foregoing explanation has been limited to the application of the present invention to the syllables of Japanese languages, but the present invention is applicable also to other syllables.

The present invention is features by the easy and separate obtaining of a consonant code and a non-consonant code from a code representing a syllable. Such an obtained code directly represents a sound code. As a result, it is extremely convenient, for example, to perform voice synthesis from entered syllables.

More specifically, the present invention is applicable to any language. In preparing a syllable table of any language, according to the present invention non-consonant phonemes are grouped in a second category. In the second category, vowels are provided with sequential code numbers and semivowel-vowel combinations are provided with codes in such a manner that the remainder obtained by dividing each code by the number of vowels is equal to the code for the vowel contained in the semivowel-vowel combination.

The present invention simplifies the process of voice synthesis from syllables input into a voice synthesizer employing different sound sources, respectively, for consonants and non-consonant phonemes.

Also, as explained in the foregoing, using a table containing the consonants only in a category of the most significant byte and containing non-consonant phonemes in another category of the less significant byte enables simplified processing, since the most significant byte represents the consonant part.

Since the syllables of Japanese language are represented by combinations of bytes in a first category including only the consonant parts of syllables of the Japanese language classified into mutually different phonetic sounds, and bytes in a second category including the non-consonant parts of syllables of the Japanese language classified into mutually different phonetic sounds, it is extremely easy to discriminate whether a syllable contains a particular sound.

Foreign language-derived words and the onomatopoeic words can be processed systematically, since foreign language-derived sound and onomatopoeic sounds of an arbitrary nature can be represented by the combination of bytes of the two categories.

Also in the second category of the non-consonant phonemes, the process of extracting the vowel only from the lower byte, is performed by encoding the semivowel-vowel combinations in such a manner that such combinations containing the same vowel provide the same remainder corresponding to the code of the vowel, when such combinations are divided, for example, by $(05)_H$.

What is claimed is:

1. A method of generating code information having first and second parts representing a syllable, said method comprising the steps of:
   providing a first set of phonemes each of which is only part of a syllable;
   providing a second set of phonemes each of which can be a syllable in combination with a consonant;
   forming a table comprising a first category of data representing the first set of phonemes provided in said first providing step and a second category of data representing the second set of phonemes provided in said second providing step;
   generating a first part of the code information using the first category of data; and
   generating a second part of the code information using the second category of data.

2. A method according to claim 1, wherein said forming step comprises the step of classifying and encoding phonemes belonging to the first category according to phonetic features.

3. A method according to claim 1, wherein said forming step comprises the step of classifying and encoding phonemes belonging to the second category according to phonetic features.

4. A method according to claim 1, wherein said forming step comprises the step of encoding, in the second category, the phonemes such that codes of the phonemes containing the same vowel part have the same remainder when divided by a certain integer.

5. A method according to claim 3, wherein said forming step comprises the step of encoding, in the second category, the phonemes such that codes of the phonemes containing the same vowel part have the same remainder when divided by a certain integer.

6. A method according to claim 4, wherein said certain integer is the number of vowels contained in the second category of data.

7. A method according to claim 5, wherein said certain integer is the number of vowels contained in the second category of data.

* * * * *

UNITED STATES PATENT AND TRADEMARK OFFICE
CERTIFICATE OF CORRECTION

PATENT NO. : 5,208,863  Page 1 of 3
DATED : May 4, 1993
INVENTOR(S) : ATSUSHI SAKURAI, ET AL.

It is certified that error appears in the above-indentified patent and that said Letters Patent is hereby corrected as shown below:

Title page, item
[56] REFERENCES CITED

OTHER PUBLICATIONS
"Application S.N. 904,906 filed Jan. 25, 1992" should read --Application S.N. 904,906 filed June 25, 1992--.

COLUMN 1
Line 51, "non-consonants" should read --non-consonant--.

COLUMN 2
Line 67, "language derived " should read --language-derived--.

UNITED STATES PATENT AND TRADEMARK OFFICE
CERTIFICATE OF CORRECTION

PATENT NO. : 5,208,863
DATED : May 4, 1993
INVENTOR(S) : ATSUSHI SAKURAI, ET AL.

Page 2 of 3

It is certified that error appears in the above-indentified patent and that said Letters Patent is hereby corrected as shown below:

<u>COLUMN 3</u>

Line 5, " / ク<sub>イ</sub> /" should read --/ グ<sub>オ</sub> /--.

Line 11, "syllables" should read --syllable--.
Line 19, "FIGS. 6.1" should read --FIGS. 6-1--.
Line 20, "and 6.2," should read --and 6-2,--.

Line 25, "/ ツ<sub>エ</sub> /" should read --/ ジェ /--; and "/ テ<sub>エ</sub> /" should read --/ ティ /--.

Line 27, "/ ウ<sub>ア</sub> /" should read --/ ヴァ /--.

Line 28, "/ ウ<sub>イ</sub> /" should read --/ ヴィ /--; and "/ ウ<sub>エ</sub> /" should read --/ ヴェ /--.

Line 33, "702." should read --7-2--.
Line 59, "[Extraction" should read --Extraction--.

Line 60, "word " テ<sub>イ</sub> " should read --word " ヾテ<sub>イ</sub> "--, and "("BETTY")]" should read --("BETTY")--.

Line 63, "テ" "("BE") should read -- "ヾ" ("BE")--.

UNITED STATES PATENT AND TRADEMARK OFFICE
CERTIFICATE OF CORRECTION

PATENT NO. : 5,208,863
DATED : May 4, 1993
INVENTOR(S) : ATSUSHI SAKURAI, ET AL.

It is certified that error appears in the above-indentified patent and that said Letters Patent is hereby corrected as shown below:

<u>COLUMN 4</u>

Line 1, "(OD03)$_H$:" should read --(OD03)$_H$--.

Line 3, "of "·)" should read --of "⊤"--.

Line 4, "deterred" should read --determined--.

Line 13, " " ·) " ("BE")" should read --"⊤" ("BE")--.

Line 16, "blow" should read --flow--.

Line 20, "of ⊥" should read --of "⊤"--.

Line 22, " " ("BE")" should read --("BE")-- and close up left margin, no double space.
Line 24, "(04)$_a$" should read --(04)$_H$--.
Line 30, "features" should read --featured--.

Signed and Sealed this

Fifth Day of April, 1994

BRUCE LEHMAN

*Attest:*

*Attesting Officer*     *Commissioner of Patents and Trademarks*